Jan. 12, 1971  D. R. ANDREWS  3,554,637
PICTURE PROJECTION WITH SOUND
Filed April 11, 1968
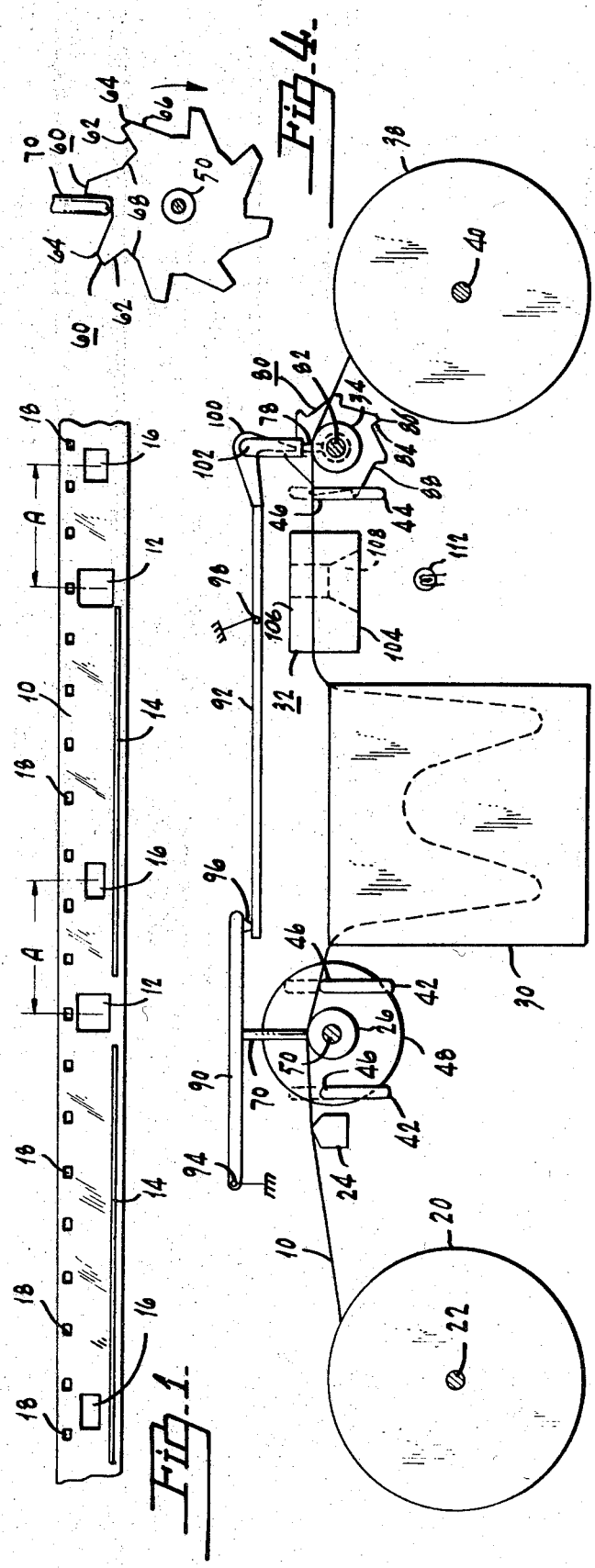
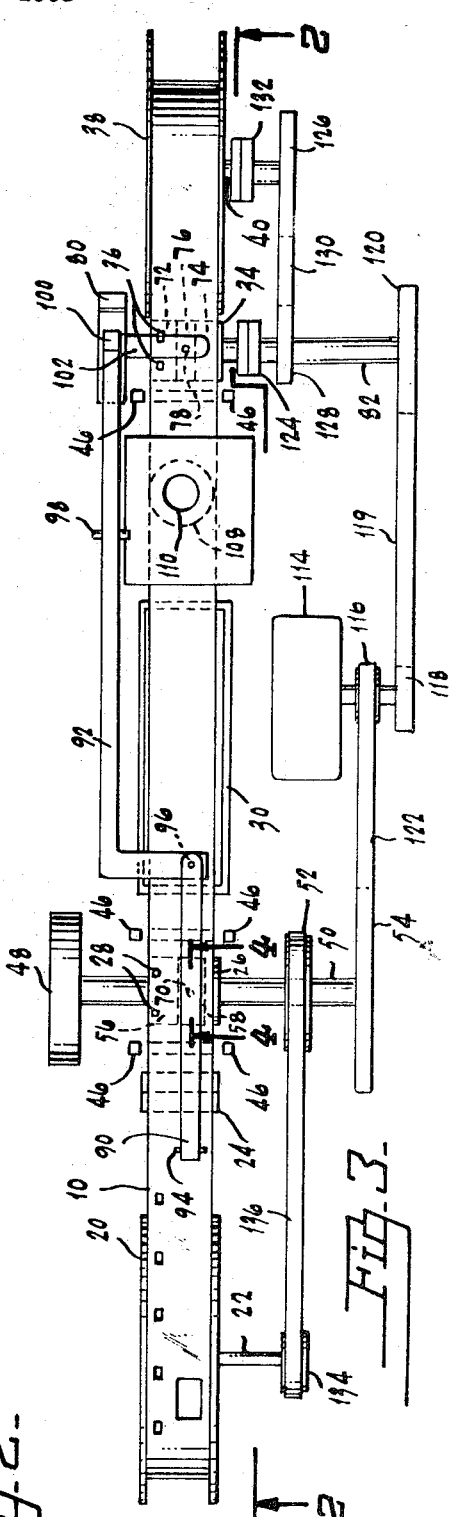
INVENTOR
DALLAS R. ANDREWS
BY Simion Yaffee
ATTORNEY

United States Patent Office 3,554,637
Patented Jan. 12, 1971

3,554,637
PICTURE PROJECTION WITH SOUND
Dallas R. Andrews, Indianapolis, Ind., assignor to
RCA Corporation, a corporation of Delaware
Filed Apr. 11, 1968, Ser. No. 720,722
Int. Cl. G03b 31/06
U.S. Cl. 353—19                             2 Claims

ABSTRACT OF THE DISCLOSURE

Apparatus for providing sound from a sound track on a film while a single frame of a picture on the film is being projected, in which the length of the sound track may be variable. The means for positioning the picture for projection are held stationary while the film is advanced through the sound reproducing arrangement. The sound reproduction being completed, a detector responsive to an indicator on the film causes the picture positioning means to be released for positioning a new picture portion of the film in the picture projecting arrangement.

BACKGROUND

Apparatus is known for projecting a single frame of a picture, such as a slide, and, while the picture is being viewed by the audience, for reproducing a recorded message concerning the picture. Such apparatus is of two types in both of which the picture transparency is stationary while it is being projected on the screen. These two types of apparatus differ in that in one thereof the sound pick-up head moves and the film is stationary, while in the other type thereof the sound pick-up head is stationary and the film moves. The second type has the advantage of simplicity resulting from the use of the stationary head, however known apparatus of the second type are not adapted to provide messages of differing lengths.

It is an object of this invention to provide improved apparatus for projecting a still picture with an accompanying sound message.

It is another object of this invention to provide improved apparatus for projecting a single frame of a picture with accompanying sound message, both of which are recorded on a film, and in which the accompanying messages are of different durations for the different pictures on the film.

SUMMARY

In accordance with this invention, a film is provided including a plurality of single frames of pictures to be projected on spaced portions thereof and including recordings of accompanying sound messages on other portions thereof. The film also includes indicators located on the film at predetermined distances from the pictures. Apparatus is provided for projecting a picture and for moving the sound portion of the film in sound reproducing relation to a sound reproducing head to reproduce the sound accompanying the picture that is being projected. The apparatus, in response to detection of an indicator, changes the picture and positions the changed picture in picture projecting position and holds it stationary therein while the sound accompanying the changed picture is being reproduced.

The invention will be better understood upon reading the description in connection with the accompanying drawing in which FIG. 1 is a view of a film that is useable with the apparatus of this invention, FIG. 2 is a partial side elevational view of an apparatus embodying this invention taken on line 2—2 of FIG. 3, FIG. 3 is a partial plan view of the apparatus of FIG. 2, and FIG. 4 is a partial sectional view, at a larger scale, of FIG. 3 on the line 4—4 thereof.

Turning first to FIG. 1, a film 10 is shown having pictures 12 to be projected which are positioned at variably spaced intervals along the film, and sound tracks 14 which may be of different lengths are positioned between the pictures 12. As viewed in FIG. 1, the film in its use moves to the right and each picture 12 leads a sound track 14. However, a sound track 14 that is between adjacent pictures 12 accompanies the picture that leads the adjacent pictures. Feelable indicators, here shown as holes 16 may be positioned along the film 10. The distance A between the several holes 16 and the nearest following pictures 12 are all equal. Sprocket holes 18 may be provided along one margin of the film 10.

The picture 12 and the accompanying recorded message along the sound track 14 on the film 10 may be reproduced by the apparatus shown in FIGS. 2 to 4. The film 10 from a supply reel 20, which is supported for rotation by means not shown about an axial 22, is fed over a sound pick-up head 24. The head 24 may be of any suitable type such as a magnetic type shown in FIGS. 2 and 3 or it may be of the optical or the mechanical type. The film extends over a sprocket wheel 26 having sprocket teeth 28 which fit into the sprocket holes 18 of the film 10. The film 10 that passes the sprocket wheel 26 goes into a film storage container 30. From the film storage container 30, the film goes through a film gate 32 and then over a sprocket wheel 34 having sprockets 36 thereon that fit the sprocket holes 18 in the film. From the sprocket wheel 34 the film 10 goes onto a storage reel 38 which rotates about an axle 40.

Film guides 42 are provided on each side of the sprocket wheel 26, and a film guide 44 is provided between the film gate 32 and the sprocket wheel 34. Since the film guides 42, 42 and 44 are used only in threading and rewinding the film 10, these film guides are moveable, as will be more fully explained, between a running or playing position, as shown in solid lines in FIG. 2, and in which the guides 42, 42 and 44 are below the film 10, and a threading or rewinding position, as shown in dotted lines in FIG. 2, in which the guides 42, 42 and 44 are raised to the point where they hold the film above the sprocket teeth 28 and 36 of the sprocket wheels 26 and 34 and guide the film 10. In their guiding position, the upstanding ears 46 (FIGS. 2 and 3), comprising portions of the guides 42, 42 and 44, embrace and guide the film 10.

A fly wheel 48 is fixed to a shaft 50 to which the sprocket wheel 26 is fixed. A pair of pulleys 52 and 54 are fixed to the shaft 50 for purpose to be explained.

The sprocket wheel 26 is formed of three portions. The upper portion 56 (as viewed in FIG. 3) is cylindrical and the sprocket teeth 28 extend therefrom. The portion 58 is also cylindrical and is of the same diameter as the upper portion 56. The middle portion is formed with teeth 60, as shown in FIG. 4.

A lagging surface 62 of a tooth 60 comprises a plane parallel to and extending through the axle 50. The tips 64 of the teeth 60 are cylindrical and of a diameter which is the same as the other portions 56 and 58 of the sprocket wheel 26. The leading edge 66 of a tooth 60 extends in a ramp-like down slanting manner from the tips 64 to the bottom portions 68 of a leading tooth 60. The bottom portions 68 are all of the same diameter and may be cylindrical in shape. The teeth 60 cooperate with a pin 70, as will be explained.

The sprocket wheel 34 comprises three cylindrical portions 72, 74 and 76 (FIG. 3) from the upper portion 72 of which extend the sprocket teeth 36. The diameter of the center portion 76 of the sprocket wheel 36 is less than the diameters of the outer portions 72 and 74 whereby a groove is formed in the sprocket wheel 34 to receive a pin 78 as will be explained.

A stop wheel 80 is provided on and fixed to the axle 82 of the sprocket wheel 34. The stop wheel 80 has leading flat tooth faces 84 extending radially, and rounded top portions 86 as well as slanting following faces 88, whereby the stop wheel 80 is provided with a plurality of stop teeth along the circumference thereof.

Two levers 90 and 92 are provided. The lever 90 is pivoted at 94 at a position above and between the supply reel 20 and the pick-up head 24, and the lever 90 extends in a leading direction. About mid way along the lever 90, the pin 70 extends downwardly to engage the toothed center portion of the sprocket wheel 26 through a hole 16 in the film 10. A boss 96 may be provided on the lower surface of and near the leading end of the lever 90 to engage the lagging end of the second lever 92.

As shown in FIG. 3, the lever 92 may be L shaped, and the boss 96 contacts the lower end (as viewed in FIG. 3) of the bottom portion of the L. The lever 92 is pivoted at 98 above and in the vicinity of the film gate 32. The leading end of the lever 92 is formed into a tooth 100 which engages one of the flat surfaces 84 of the teeth on the stop wheel 80. A bridge portion 102 extends laterally from the leading end portion of the lever 92 over the sprocket wheel 34 and downwards as viewed in FIG. 2. The lower end of the bridge portion 102 is formed into the pin 78 which extends through a hole 16 in the film 10 and into the groove in the sprocket wheel 34.

The film gate 32 comprises a first member 104 and a second member 106 which have grooves in their contacting faces to receive the film 10. A funnel shaped hole 108 is provided through the first member 104, the large end of the hole 108 being directed away from the member 106. A registering round hole 110 is provided in the member 106. A light source 112 is provided below the gate 32, as viewed in FIG. 2, and projecting lenses (not shown) may be provided at the upper side of the gate 32, whereby the picture in the film gate 32 may be projected on a screen (not shown).

For ease in threading the film, the levers 90 and 92 are pivoted on a swingable cover (not shown). In the running position of the described apparatus, when the cover is closed, the guides 42, 42 and 44 may be pushed, by means not shown, to their position as shown in solid lines in FIG. 2, whereby the film will be held in position by the cooperation of the sprocket teeth 28 and 36 with the sprocket holes 18 in the film 10, in a known manner, the pins 70 and 78 holding the film 10 against their respective sprocket wheels. When the cover (not shown) is raised, the pins 70 and 78 do not contact the film 10, and the film guides 42, 42 and 44 raise up to their dotted positions to the point where they hold the film above the sprocket teeth 28, 36 of the sprocket wheels 26, 34 to guide the film 10 in the threading or rewind thereof.

Drive means for the disclosed apparatus is shown in FIG. 3. A constant speed motor 114 is provided having pulleys 116 and 118 on the shaft of the motor 114. A cooperating pulley 120 is fixed to the axle 82 of the sprocket wheel 34. The pulleys 116 and 54 are of the toothed type, and a toothed belt 122 couples the pulleys 116 and 54. Therefore, as long as the motor 114 runs, the sprocket wheel 26 turns at a constant speed, pulling the film 10 at a constant speed past the head 24. The fly wheel 48 assists in keeping the rotational speed of the sprocket wheel 26 constant.

A belt 119 couples the pulleys 118 and 120. The shaft 82 of the sprocket wheel 34 is not continuous and a slip clutch 124 is provided therealong. While the pulleys 116 and 118 are of the same size, the pulley 120 is much smaller than the pulley 54, whereby when the sprocket wheel 34 is permitted to rotate as will be explained, the sprocket wheel 34 causes much faster travel of the film 10 than the sprocket wheel 26. Also, the take up reel 38, which is driven by means of a pulley 126 on the shaft 40 and a pulley 128 on the shaft 82, coupled in a known manner by a slippable belt 130, is driven fast enough to properly wind film on the take up reel 38 that is fed to it by the sprocket wheel 34. If desired, instead of the slipping belt 130, a slipping clutch 132 may be provided in the axle or shaft 40 between the pulley 126 and the reel 38.

A pulley 134 is provided on the shaft 22 of the supply reel 20 that may be adjusted to turn freely thereon during run or may be fixed thereto during rewinding, in a known manner. A crossed belt 136 may be provided to cause rotation of the reel 20 in the rewind direction. If desired, a slipping clutch (not shown) may be provided along the shaft 22 of the reel 20, or the crossed belt 136 may slip or it may be removed during rewinding.

For threading and rewind, the cover (not shown) is raised, whereby the levers 90 and 92 are moved out of relation with the sprocket wheels 26 and 34 and out of possible contact with the stop wheel 80, allowing the film guides 42, 42 and 44 to raise to their dotted portions as viewed in FIG. 2. Then the film 10 is threaded from the reel 20 through the guides 42, 42 and the gate 32 and the guide 44 and it is fixed to the take up reel 38 in a normal manner. The cover is closed, whereby the levers 90 and 92 are brought back to their operating position and the guides 42, 42 and 44 are lowered.

In threading the film, a hole 16 in the film 10 should be just back of the sprocket wheel 34 and the next lagging hole 16 should be in the storage compartment 30 and the second lagging hole 16 should be just in advance of the sprocket 26.

The motor 114 is turned on and the sprocket wheels 26 and 34 start to turn. Soon, a hole 16 arrives over the pin 78. The lead end of the lever 92 falls and the hook 100 catches a tooth of the stop wheel 80, stopping further rotation of the sprocket wheel 34. The distance A, see FIG. 1, and the relationship of the holes 16 to the sprocket holes 18 is such that a picture 12 on the film 10 is in picture projecting position in the gate 32. The sound track for the picture that is in picture projecting position is at the lagging side of the sound pick-up head 24. The film is fed at a steady rate past the head 24 and the sound message thereon is reproduced by the head 24 in the usual manner. The film that passes the sprocket wheel 26 is stored in the compartment 30, whereby two sound messages and two pictures are stored therein before the picture is changed in a manner to be described. At the end of the message 14, the next hole 16 in the film 10 arrives at the pin 70. The pin 70 falls into the hole 16 and against a tooth bottom 68 of the center or toothed portion of the sprocket wheel 26. The leading end of the lever 90 falls and raises the pin 78 at the sprocket wheel 34 out of the hole 16 in the film 10 and disengages the hook end 100 of the lever 92 from the stop wheel 80. The sprocket wheel 34 as well as the take up reel 38 are permitted to turn and the sprocket wheel 34 feeds film very quickly to the reel 38 until the next hole arrives at the pin 78. Since the sprocket 26 is turned at a constant rate, the pin 70 rides up the ramp 66 of the toothed portion of the sprocket wheel 26 raising the lever 90, and permitting the lever 92 to turn clockwise (as viewed in FIG. 2) about its pivot 98 when the next hole 68 arrives at the pin 78. The sprocket wheel 26, which, as has been stated, rotates at a constant rate, moves the film 10 a shorter distance than the sprocket 34 while they are both turning, until the leading edge of the next sound message approaches the sound head 24. As has been stated, the several sound tracks may be of different lengths. Therefore, the distance between any hole 16 and the beginning of the next sound message should be such that while the film is being advanced the distance equal to that between two successive holes 16 by the sprocket wheel 34, the sprocket wheel 26 advances the film the distance between a hole 16 and the beginning of the next sound track 14, or a distance a little short thereof.

Since there is always at least a short length of film in the storage container 30, no sudden strain is put on the film 10 by the much faster feeding of the film by the sprocket wheel 34 than by the sprocket wheel 26, that is, due to the residual amount of film 10 stored in the container 30, the film 10 is never suddenly tightened by the action of the sprocket wheels 26 and 34. However, the sound track 14 that is related to or accompanies the picture 12 that is positioned to be projected in the film gate 32 is not the sound track 14 that is adjacent that picture 12. The sound track 14 that is beyond the second hole 16 in the lagging direction of the film 10 from the picture being projected is the sound track related to or accompanying it.

As soon as the next hole 16 arrives at the pin 70, the lever 90 drops and turns the lever 92. The hook 100 disengages the stop wheel 80 and the sprocket wheel 34 feeds film quite fast until the next hole 16, (which had been in the storage compartment 30) arrives at the pin 78, permitting the leading end of the lever 92 to drop and to engage the hook 100 with the stop wheel 80. The next picture is shown and the accompanying sound track is near or at the lagging edge of the sound head 24 whereby the message accompanying the next picture will soon be reproduced.

Variations of the described apparatus may occur to a person skilled in the art. For example, a notch may be substituted for the hole 16. Therefore the above description should be considered as illustrative and not in a limiting sense.

What is claimed is:

1. Apparatus for projecting a picture and reproducing a sound recorded in spaced relation to said picture along a film, said film having an indicator thereon, comprising picture projecting means,
   sound reproducing means spaced from said picture projecting means,
   means including a first sprocket wheel to move the film that is adapted to be used with said apparatus and which has a picture and a sound message recorded thereon to a picture position with respect to said picture projecting means and further including means to prevent rotation of said first sprocket wheel for stopping said film in said position,
   means to move the portion of said film having said sound message thereon past said sound reproducing means,
   means to detect said indicator on said film, and
   means including means for releasing said rotation preventing means responsive to the detection of said indicator by said detecting means to cause motion of said film past said picture projecting position.

2. Apparatus for projecting and reproducing a sound recorded on a film, said film having a plurality of pictures and sound records along the length thereof and a respective feelable indicator in spaced relation to each picture along said film,
   a sound head,
   means continuously to draw said film past said head,
   a picture projecting gate,
   means to move said picture into picture reproducing position in said gate,
   first rotatable lever means having a pin which is positionable in contact with said film in the vicinity of said sound head,
   second rotatable lever means having a pin which is positionable in contact with said film in the vicinity of said film gate,
   said second lever in one of its rotated positions acting to prevent motion of said film through said film gate whereby a picture is positioned for projection in said film gate, and
   said first lever moving upon detection of said indicator and in moving causing motion of said second lever to a position to release said film whereby said film may be moved through said film gate.

References Cited
UNITED STATES PATENTS
| | | | |
|---|---|---|---|
| 1,826,786 | 10/1931 | Hopkins | 353—19 |
| 2,581,079 | 1/1952 | Coutelen | 353—15 |
| 3,230,825 | 1/1966 | Knight | 353—19 |

FOREIGN PATENTS
| | | | |
|---|---|---|---|
| 1,077,986 | 10/1957 | France | 353—15 |

(Third addition No. 67,523)

HARRY N. HAROIAN, Primary Examiner